(12) United States Patent
Hoeks et al.

(10) Patent No.: US 8,038,540 B2
(45) Date of Patent: Oct. 18, 2011

(54) TUNED MASS DAMPER FOR ROTATING SHAFTS

(75) Inventors: Luis Hoeks, Eschweiler (DE); Marco Schwab, Cologne (DE); Christian Felchner, Wuppertal (DE)

(73) Assignee: Neapco Europe GmbH, Duren (DE)

( * ) Notice: Subject to any disclaimer, the term of this patent is extended or adjusted under 35 U.S.C. 154(b) by 0 days.

(21) Appl. No.: 12/819,530

(22) Filed: Jun. 21, 2010

(65) Prior Publication Data

US 2010/0285892 A1 Nov. 11, 2010

Related U.S. Application Data

(63) Continuation of application No. PCT/EP2008/067943, filed on Dec. 18, 2008.

(30) Foreign Application Priority Data

Dec. 20, 2007 (DE) .......................... 10 2007 062 423
Jan. 30, 2008 (DE) .......................... 10 2008 006 782

(51) Int. Cl.
*F16F 7/108* (2006.01)

(52) U.S. Cl. .............................. 464/180; 403/1; 188/379

(58) Field of Classification Search .................. 464/180; 188/378–380; 74/574.4; 29/897.2, 901; 403/1; 248/227.3, 227.4

See application file for complete search history.

(56) References Cited

U.S. PATENT DOCUMENTS

| 863,887 | A | * | 8/1907 | Stuttle |
| 2,764,038 | A | * | 9/1956 | Peirce et al. ................. 74/574.4 |
| 2,878,689 | A | * | 3/1959 | Aebersold .................... 74/574.4 |
| 4,196,786 | A | * | 4/1980 | Hornig et al. ............. 188/378 X |
| 5,013,166 | A |   | 5/1991 | Domer |
| 6,793,050 | B2 | * | 9/2004 | Nylander et al. ............. 188/379 |
| 7,093,698 | B1 | * | 8/2006 | Chen ............................ 188/379 |

FOREIGN PATENT DOCUMENTS

| DE | 690 00 203 T2 | 12/1992 |
| DE | 43 35 766 A1 | 4/1995 |
| EP | 0 381 566 A | 8/1990 |

OTHER PUBLICATIONS

International Search Report of foreign counterpart Application No. PCT/EP2008/067943; mailing date Apr. 28, 2009.

* cited by examiner

*Primary Examiner* — Gregory Binda
(74) *Attorney, Agent, or Firm* — Summa, Additon & Ashe, P.A.

(57) ABSTRACT

The apparatus relates to a vibration absorber for mounting onto the outer circumference of a rotating shaft or axis having an inner part (3) of substantially resilient material for abutting against the outer circumference of the shaft or axis, and an outer part (2, 2'), which comprises at least two segments (2, 2a, 2b), that grips around the inner part and abuts it vibratingly, and serves as an inertial mass member. The segments (2, 2a, 2b) are configured at their two ends in the circumferential direction with connecting members (5a, 5b, 5a', 5b', 6a, 6b, 6a', 6b') formed integrally therewith for establishing a mutual latching connection.

12 Claims, 3 Drawing Sheets

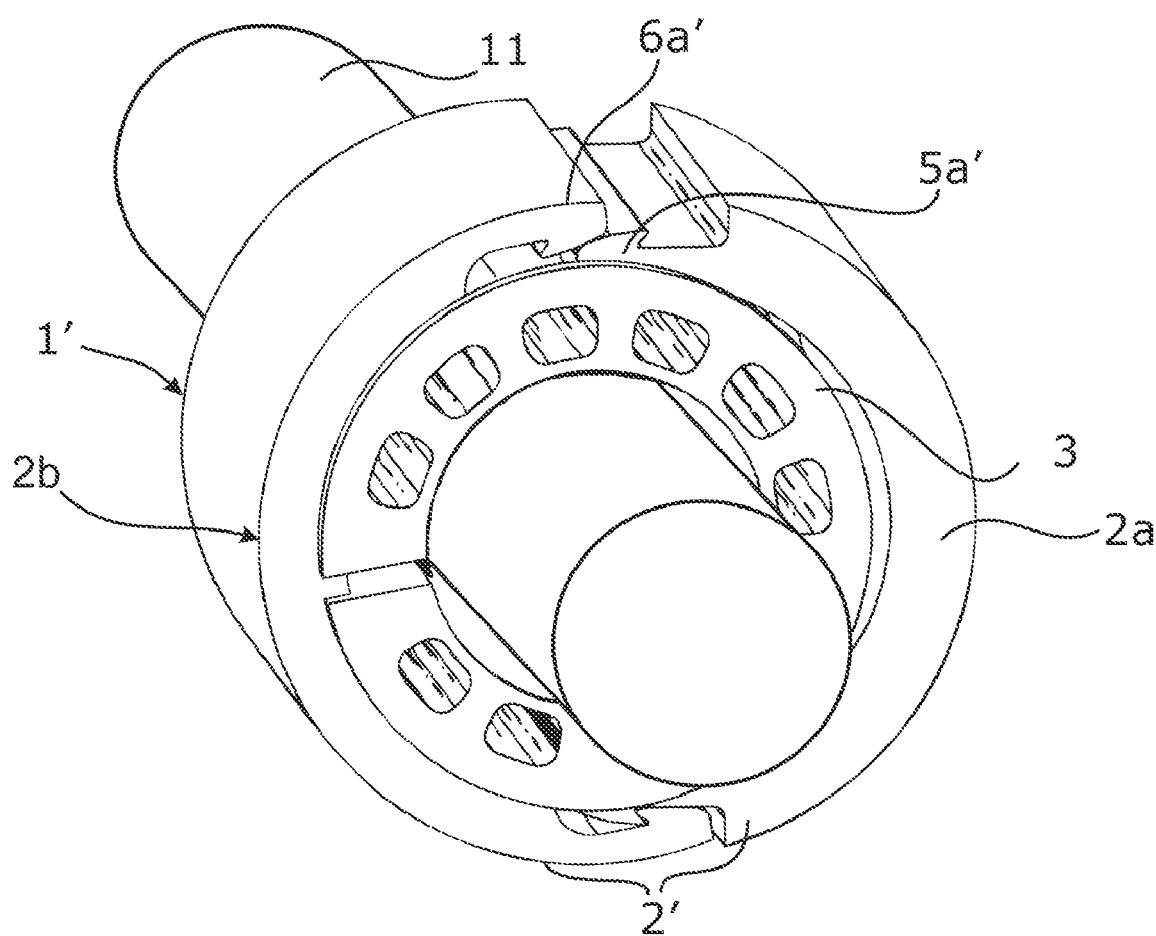

TUNED MASS DAMPER FOR ROTATING SHAFTS

CROSS REFERENCE TO PRIORITY APPLICATIONS

This application is a continuation of pending International Application No. PCT EP2008/067943 (filed Dec. 18, 2008, and published Jul. 2, 2009, as Publication No. WO 2009/080718 A1) which itself claims the benefit of commonly assigned German Application Serial No. 10 2008 006 782.2 (filed Jan. 30, 2008), and commonly assigned German Application Serial No. 10 2007 062 423.0 (filed Dec. 20, 2007). This application hereby claims the benefit of and incorporates entirely by reference International Application No. PCT EP2008/067943, German Patent Application Serial No. 10 2008 006 782.2, and German Patent Application Serial No. 10 2007 062 423.0.

FIELD OF THE INVENTION

The invention relates to a vibration absorber for mounting onto the outer circumference of a rotating shaft or axis. Vibration absorbers or vibration dampers are generally used for reducing low- and high-frequency vibrations in machines, plants and buildings. The function of an absorber is based on a spring-mass system that counteracts the interfering vibration, thus subduing it. If damping elements are used in the process, the term often used is vibration damper. The mass of the absorber depends on the mass of the system to be subdued. Thus, such vibration absorbers are also used on rotating shafts or axes every time when vibrations are to be suppressed, for example, because imbalances cannot be avoided entirely and/or self-resonances can be excited, in order to put little stress on the structure and/or to minimize acoustic disturbance. Thus, the vibration absorbers are also used for drive shafts of motor vehicles and, apart from the above-mentioned effects, also provide for a suppression and/or absorption of interfering vibrations in the drive train, i.e. vibrations that are not only based on imbalances, the suppression having a positive effect on the steering and driving behavior.

BACKGROUND

A vibration absorber provided for a drive shaft in a motor vehicle is known, for example, from DE 196 38 290 A1. Since the latter is not segmented, the later assembly of the vibration absorber is complicated because the shaft has to be detached at least at its one end in order to put the vibration absorber over it. It was found in practice that, due to tolerances in the production of the vehicle or of its drive components, it is frequently necessary to retrofit vibration absorbers. There is a basic demand for simplifying this retrofitting by the shaft or axis not having to be disassembled.

A vibration absorber that can be retrofitted in this manner is known from DE 43 35 766 A1. It comprises an inner part including two half-shells, which rest on the outer circumference of the rotating shaft, and a deformable spring member. An outer part serving as an inertial mass member is disposed so as to grip around the spring member. It consists of two segments respectively connected, at their one end, in an articulated manner, and which are clamped at their other end by means of a separate closing member. What is disadvantageous in this structure on the one hand is the fact that the closing member is formed as a separate component. In order to fasten the closing member, recesses are required in the outer part, which cause imbalances and must be compensated for elaborately, at least at high rotational speeds. In addition, the clamp can become detached due to the high centrifugal forces and in particular in the case of fatigue in the clamp, which is based, inter alia, on the fact that the clamp can drop off in the radial direction. Moreover, due to the separate closing member, an additional part is required which has a negative effect on the storage and transport costs. Moreover, a plurality of parts renders assembly more difficult, because the outer part first has to be compressed, in order to attach the clamp in the next step while the outer part is compressed. This demands a lot of skill on the part of the fitter. On the other hand, the articulated connection is disadvantageous in that it disadvantageously provides for recesses in the ideally rotation-symmetrical outer part because of the provision of pivotability; the recesses must be compensated for elaborately in order to avoid imbalances. In addition, a certain amount of space is required for assembly in order to be able to attach the folded-open outer part on the shaft or axis vertically in relation to the axis of rotation. As a rule, the drive shafts of a motor vehicle lack this space.

A torsion bar bearing is known from DE 690 00 203 T2 in which a relatively rigid frame of two opposite half-shells has ribs of resilient material on each of the insides of the half-shells. The half-shells are configured at their two ends in the circumferential direction with connecting members formed integrally therewith, in order to establish a mutual latching connection.

In view of the above drawbacks of the prior art, it is therefore the object of the present invention to provide an improved vibration absorber for clamping attachment to the outer circumference of a rotating shaft or axis, which enables an inexpensive, secure and simple attachment. This object is achieved with a vibration absorber as set forth in the independent claims. Advantageous embodiments are in each case the subject matter of the dependent claims.

SUMMARY OF THE INVENTION

The invention relates to a vibration absorber for clamping attachment to the outer circumference of a rotating shaft or axis, for example a drive shaft of a drive train of a motor vehicle. The vibration absorber comprises an inner part of a substantially resilient, for example elastically deformable material. The inner part, when attached to the shaft or axis, abuts against their outer circumference with at least one of its surfaces. The vibration absorber moreover comprises an outer part comprising at least two segments, said outer part gripping around the inner part when attached to the shaft or axis. Because of the resilience of the inner part, the outer part is mounted so as to be able to vibrate with respect to the shaft or axis and, for example because of its large weight in comparison to the inner part, serves as the inertial mass member of the "spring-mass system" mentioned in the introduction. The outer part can be produced from the same material as the inner part. Preferably, the specific gravity of the material of the outer part will be selected comparatively large, for example compared with that of the inner part, in order to achieve a compact construction of the vibration absorber despite its large mass. The principle of vibration reduction in the shaft or axis based in the "spring-mass system" provided by the vibration absorber is not the subject matter of the invention and is known to the person skilled in the art. Thus, only a few attempts are required for obtaining the desired vibration reduction in the axis or shaft, for example by the shift or dampening of the natural frequency caused thereby, by adjusting the resilience or elasticity of the inner part, optionally its dampening capacity and by setting the inertial mass provided by the outer part, as well as by suitably selecting the position of the vibration absorber along the longitudinal direction of the shaft or axis.

The invention is not limited with regard to the connection between the inner part and the outer part. For example, the inner part can merely be clamped between the outer part and the outer circumference of the shaft or axis, an adherent connection between the outer part and the inner part may be provided, the outer part can be integrated at least partially into the inner part, for example injected or cast around it.

The vibration absorber according to the invention is characterized in that the segments are configured at their two ends in the circumferential direction with connecting members formed integrally therewith, in order to establish a mutual latching connection. It is thus accomplished that the number of components is reduced to a minimum, but that at least the outer part can be easily mounted in the radial direction, i.e. transversely to the axis of rotation, without the shaft or axis having to be disassembled in order to be able to put the outer part over the shaft or axis end. Storage costs, production costs and transport costs can thus be reduced. Due to the latching connection on both sides of a segment, the outer part can easily be mounted, in particular requiring little space, wherein compression at the same time causes the latching effect, which simplifies assembly considerably. This feature makes assembly easier in narrow assembly areas and/or assembly areas that are difficult to access. Because of the latching connections, which are formed integrally with the respective segment, an assembly of the put-together outer part that is largely free of imbalances is easily accomplished. Because the latter, as a rule, is comparatively heavy, any inhomogeneity easily becomes noticeable as an imbalance and would have to be compensated, in particular in the case of high rotational speeds. This is largely prevented by means of the connecting members formed integrally with the segment.

Preferably, the segments in the connected state form a substantially annular rotation body (i.e., the outer part in the state where it is mounted on the shaft or axis) is rotation-symmetrical relative to the axis of rotation of the shaft or axis. Imbalances because of the comparatively heavy outer part are thus avoided particularly well. Preferably, the outer part is substantially configured as a segmented ring.

For reasons of cost and durability, the inner part preferably consists of synthetic or natural rubber. Synthetic high-temperature rubber is preferably used. A thermoplastic elastomer, such as cross-linked polyurethane, can be used as a substitute for synthetic or natural rubber. In order to facilitate assembly, the inner part is preferably configured as a slotted ring.

As the material for the outer part with a comparatively high specific gravity, but also in order to provide sufficient strength at high centrifugal forces, an iron alloy, such as steel, is preferably used.

In a preferred embodiment, the respective connecting members comprise at least two complementarily configured appendages extending in the circumferential direction of the outer circumference, with latching lugs extending in the radial direction that can mutually grip behind one another. It was found that a particularly secure connection can be achieved even at high centrifugal forces by this arrangement of the appendages in the circumferential direction and their latching in the radial direction by one gripping behind the other, which can substantially be ascribed to the fact that the connecting members can only be separated by being pulled apart in the tangential direction, but that the centrifugal force acts perpendicular thereto, thus even supporting the latching effect.

In another advantageous embodiment, the outer part and the inner part are configured such that the resilient inner part is compressed during the attachment on the outer circumference of the rotating shaft or axis, for example because the outer dimension or outer diameter of the inner part is larger than the inner dimension or inner diameter of the outer part. A particularly secure and displacement-resistant clamping attachment on the outer circumference of the rotating shaft or axis and an efficient vibration coupling is thus achieved.

In another advantageous embodiment, the outer part comprises identically formed segments. Thus, the number of different components can be reduced further and advantageously with regard to storage costs, transport costs or production costs. Moreover, assembly is thus simplified.

The invention further relates to an assembly set for at least one vibration absorber in one of the above-described embodiments and for attachment to a rotating shaft or axis. The set is characterized by a plurality of inner parts and/or outer parts, which differ at least with regard to the outer diameter and/or the inner diameter. The adaptation of the vibration damper to shafts of different dimensions and/or the setting of different vibration-reducing effects of the vibration damper are achieved by means of the assembly set. Moreover, the plurality of outer parts can differ with regard to their weight. Moreover, the plurality of inner parts can differ with regard to their elasticity and/or their damping capacity.

The invention further relates to a drive shaft for a motor vehicle as well as to a motor vehicle with a vibration absorber clampingly attached to the outer circumference of the drive shaft in one of the above-described embodiments and with the above-described advantages respectively connected therewith.

The invention further relates to an assembly method for attaching the vibration absorber in one of the above-described embodiments to a rotating shaft or axis, wherein, in a first step, the inner part of substantially resilient material is applied to the outer circumference of the shaft or axis, and in a second step, the outer part, which comprises at least two segments and serves as an inertial mass member, is applied so as to grip around the inner part. In the process, the segments in the second step are mutually latched at their two ends in the circumferential direction with connecting members formed integrally therewith. Thus, assembly can be carried out simply and under comparatively cramped assembly conditions or in assembly areas that are difficult to access, by simple compression with latching.

In another advantageous embodiment, the assembly method provides the outer part, preferably the inner part and the outer part, to be applied, in a direction perpendicular to the axis of rotation of the shaft or axis, onto the latter. Thus, the outer part, or both the outer as well as the inner part, can be assembled without disassembling the shaft or axis.

Two preferred embodiments of the vibration absorber according to the invention are shown in the attached figures, without limiting the invention to them.

BRIEF DESCRIPTION OF THE DRAWINGS

FIG. 5 is a perspective view of the largely assembled vibration absorber depicting the drive shaft.

DETAILED DESCRIPTION

Figure 1:
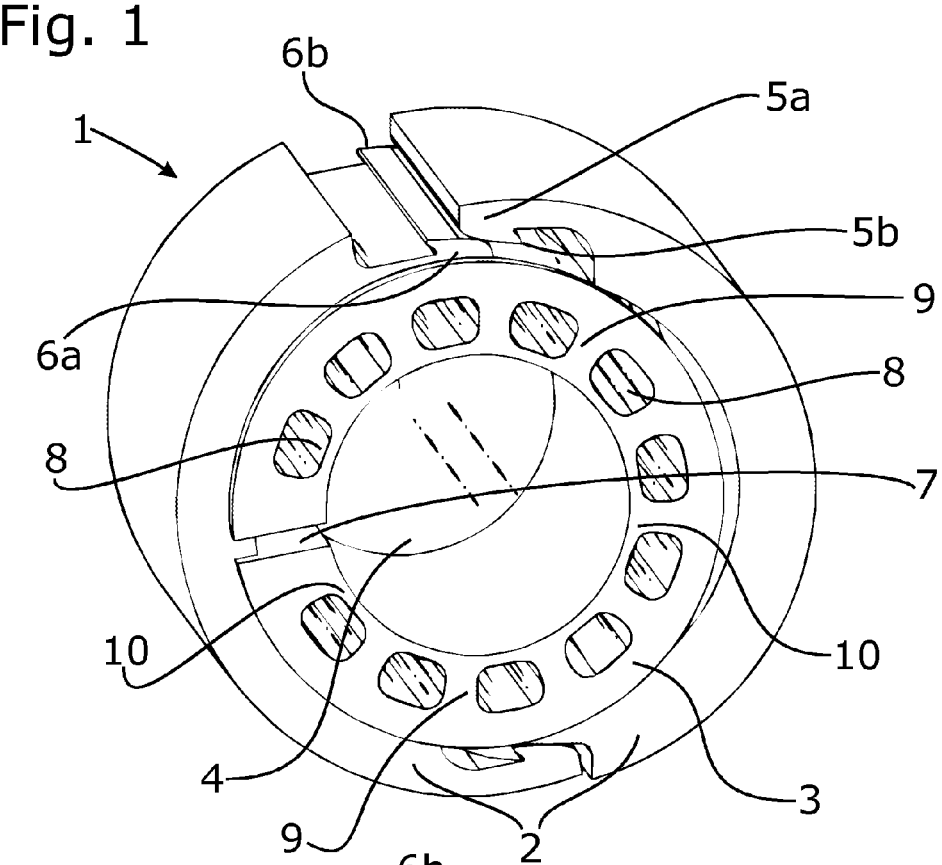
FIG. 1 is a perspective view of the largely assembled vibration absorber in a first embodiment.
Figure 2:
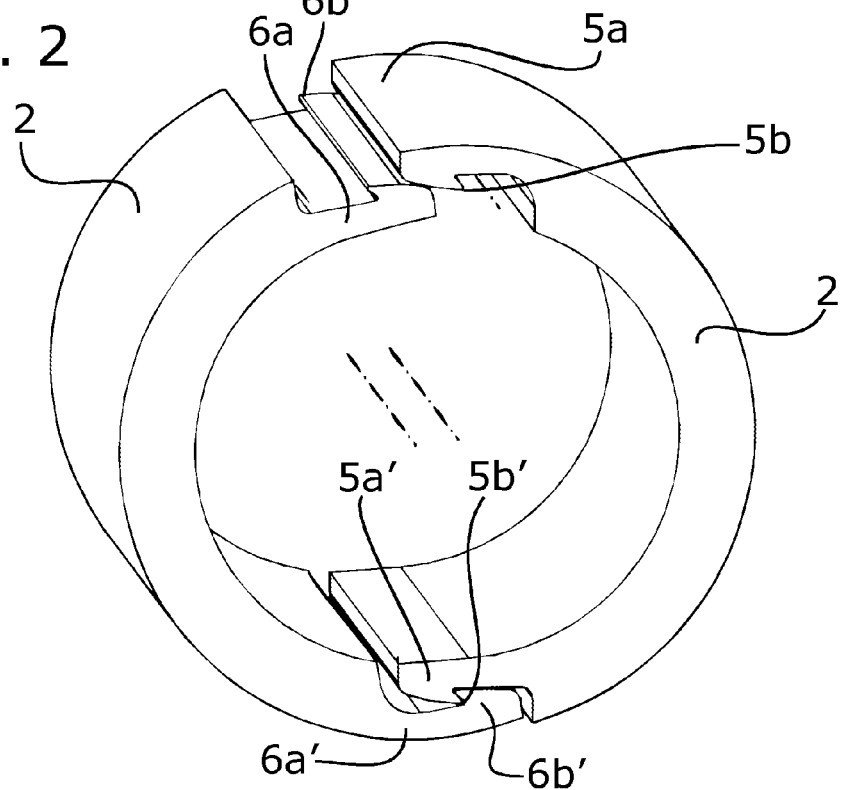
FIG. 2 is a perspective view of the outer part of the vibration absorber from FIG. 1.
Figure 3:
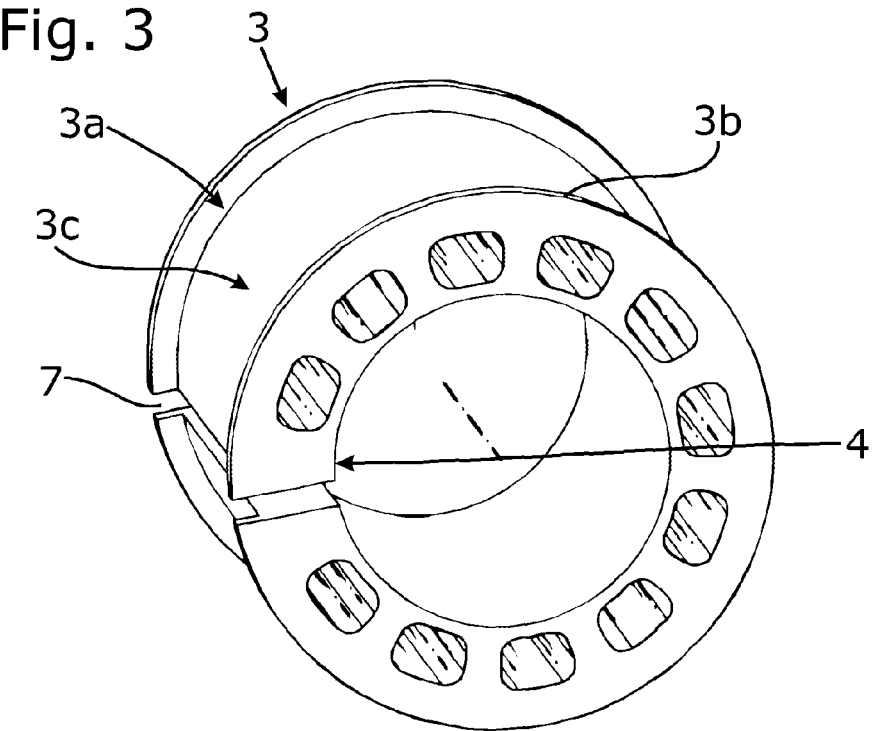
FIG. 3 is a perspective view of the inner part of the vibration absorber from FIG. 1.

As FIGS. 1, 2 and 3 show, the vibration absorber 1 according to the invention comprises an inner part 3 consisting of synthetic high-temperature rubber and an outer part 2 consisting of steel. Both are substantially configured as annular rotation bodies. The hole 4 in the inner part 3 formed by the annular shape, when the vibration absorber is mounted onto a shaft or axis 11 (see FIG. 5), abuts their outer circumference with its cylindrical inner wall. In order to avoid disassembly of the shaft, the inner part 3 is provided with a slot 7 by means of which the inner part 3 can be put on the shaft or axis in a transverse direction to their longitudinal direction, without having to detach the shaft at least on one end from its installation space.

The inner part 3 comprises a plurality of open chambers 8 distributed evenly in the circumferential direction, which in the axial direction extend completely through the inner part 3. Alternatively, the chambers 8 may also be sealed on one or both sides. Compressible webs 9, which substantially extend in the radial direction and the dimensions of which have a substantial effect on the dampening behavior of the vibration absorber, lie between the chambers 8. On the inside, the chambers 8 and webs 9 are adjoined by a ring 10 with a substantially plane inner circumferential surface which provides for good mechanical contact between the inner part 3 and the shaft. In this case, the inner part 3 is preferably formed of one piece. In an alternative embodiment, the inner part 3 is configured without chambers 8 and web 9 having been formed.

As is shown in detail in FIG. 3, the inner part 3 has a flat outer wall 3c against which the outer part 2 abuts in the assembled state. The jacket surface 3c is provided on its two boundary edges, which are located at the end faces of the inner part 3, with one collar-like projection 3a, 3b, respectively, in order to prevent a displacement of the outer part 2 or of its segments relative to the inner part 3, among other things also during assembly. As FIG. 2 shows in detail, the annular outer part 2 of the first embodiment is composed of two identically configured segments 2 whose ends, which lie in the circumferential direction, are connected with each other by means of latching connections. For this purpose, each segment 2 comprises an appendage (or connecting member) 5a, 6a', which is an extension of the outer wall, and an appendage (or connecting member) 6a, 5a', which is an extension of the inner wall, said appendages substantially being configured to be complementary with respect to each other. During assembly, they are pushed into one another in a direction tangential to the circumferential direction, wherein the latching lugs (or connecting members) 5b, 6b, 5b', 6b', which point in the radial direction, latch with each other by gripping behind each other, deflecting the appendage or appendages elastically, after a ramp-like section of the appendage is overcome. Thus, the segments 2 are held so as to fix each other in the circumferential direction, wherein the collar-like projections 3a, 3b on the inner part 3 prevent lateral displacement, so that a fixing of the segments 2 in the longitudinal direction of the shaft or axis is achieved. The inner diameter of the outer part 2 is dimensioned such that the inner part 3 is compressed when the latched state of the latching connections is reached.

Figure 4:
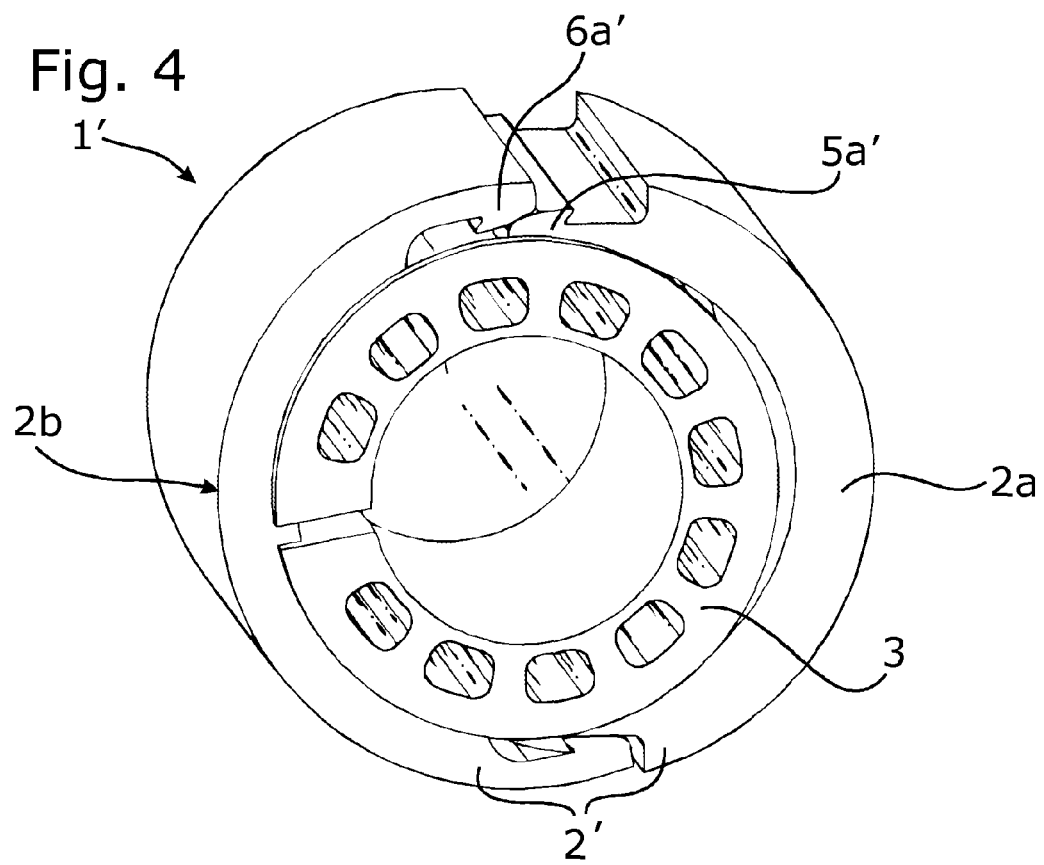
FIG. 4 is a perspective view of the largely assembled vibration absorber in a second embodiment.

The second embodiment shown in FIG. 4 differs from the first embodiment shown in FIGS. 1, 2 and 3 in that the outer part 2' comprises two differently configured segments 2a, 2b. Because the segment 2b has on each of its ends pointing in the circumferential direction an appendage 6a', which is an extension of the outer wall, whereas the segment 2a has an appendage 5a', which is an extension of the inner wall, at each of its ends pointing in the circumferential direction.

In the vibration absorbers 1, 1' according to the invention, the bias causing the connection between the vibration absorber and the shaft can in principle either be realized solely via the outer parts 2, 2' and their appendages 5a, 5b, 6a, 6b or in combination with an oversize relative to the elastic inner part 3, as is shown in FIG. 4. However, the bias can also be generated solely by means of the oversize relative to the elastic inner part 3, as is shown in FIG. 1.

The invention claimed is:

1. A vibration absorber (1, 1') for clamping attachment to the outer circumference of a rotating shaft or axis, comprising:
   an inner part (3) of substantially resilient material for abutting against the outer circumference of the shaft or axis; and
   an outer part (2, 2'), which comprises at least two segments (2, 2a, 2b), that grips around the inner part and abuts the inner part vibratingly, and which serves as an inertial mass member;
   wherein the segments (2, 2a, 2b) are configured at their respective two ends in the circumferential direction with connecting members (5a, 5b, 5a', 5b', 6a, 6b, 6a', 6b') formed integrally therewith for establishing a mutual latching connection;
   wherein the respective connecting members (5a, 5b, 5a', 5b', 6a, 6b, 6a', 6b') comprise at least two complementarily configured appendages (5a, 5a', 6a, 6a') extending in the circumferential direction of the outer circumference, with latching lugs (5b, 5b', 6b, 6b') extending in the radial direction that can mutually grip behind one another; and
   wherein the inner part (3) is provided at its end faces with one collar-like projection (3a, 3b), respectively, for fixing the segments (2, 2a, 2b) in the longitudinal direction of the shaft or axis.

2. The vibration absorber (1, 1') according to claim 1 wherein the segments (2, 2a, 2b), in the connected state, substantially form an annular rotation body.

3. The vibration absorber (1, 1') according to claim 1 wherein the inner part (3) substantially comprises rubber selected from synthetic rubber, natural rubber, or synthetic high-temperature rubber, or combinations thereof.

4. The vibration absorber (1, 1') according to claim 1 wherein the inner part (3) is configured as a slotted ring.

5. The vibration absorber (1, 1') according to claim 1 wherein the outer part (2, 2') is substantially configured as a segmented ring.

6. The vibration absorber (1, 1') according to claim 1 wherein the outer part (2, 2') comprises material selected from an iron alloy, a heavy or non-ferrous metal, or a synthetic material with a metallic insert, or combinations thereof.

7. The vibration absorber (1, 1') according to claim 1 wherein the outer part (2, 2') and the inner part (3) are configured such that the resilient inner part is compressed during the attachment on the outer circumference of the rotating shaft or axis.

8. The vibration absorber (1, 1') according to claim 1 wherein the outer part (2) comprises identically configured segments (2).

9. A drive shaft for a motor vehicle having at least one vibration absorber (1, 1') according to claim 1 wherein the vibration absorber (1, 1') is clampingly attached to the outer circumference of the drive shaft.

10. An assembly method for attaching the vibration absorber (1, 1') according to claim 1 to a rotating shaft or axis, the method comprising the steps of:
applying the inner part (3) of substantially resilient material to the outer circumference of the shaft or axis; and
applying the outer part (2, 2') to the inner part (3), the outer part (2, 2') comprises at least two segments (2, 2a, 2b) and serves as an inertial mass member, so as to grip around the inner part;
wherein the segments (2, 2a, 2b) are mutually latched at their respective two ends in the circumferential direction with connecting members formed integrally therewith.

11. The assembly method for attaching the vibration absorber (1, 1') according to claim 10 wherein at least the outer part is applied, in a direction perpendicular to the axis of rotation of the shaft or axis, onto the latter.

12. A vibration absorber (1, 1') for attaching to an outer circumference of a rotating shaft defining an axis comprising:
an inner part (3) formed of substantially resilient material for abutting against the outer circumference of the shaft;
an outer part (2, 2') having at least two segments (2, 2a, 2b) that surround at least a portion of the inner part, the outer part abutting the inner part during vibration of the shaft and serving as an inertial mass member;
one or more connecting members (5a, 5b, 5a', 5b', 6a, 6b, 6a', 6b') formed integrally with ends of the segments (2, 2a, 2b), the connecting members extending circumferentially from at least a portion of the ends of the segments for securing the ends together;
at least two appendages (5a, 5a', 6a, 6a') forming a part of the connecting members and extending circumferentially from remaining parts of the connecting members that correspondingly engage one another;
at least two latching lugs (5b, 5b', 6b, 6b') extending radially from the appendages that correspondingly engage one another; and
at least one collar (3a, 3b) positioned about at least a portion of an end face of the inner part (3) for preventing movement of the segments (2, 2a, 2b) in the longitudinal direction of the shaft.

\* \* \* \* \*